United States Patent
Perez Gomez

(10) Patent No.: US 10,836,683 B2
(45) Date of Patent: Nov. 17, 2020

(54) METHOD OF MAKING A SINK FROM CERAMIC MATERIAL SLABS

(71) Applicant: Manufacturas Siles, S.L., Valdemoro (ES)

(72) Inventor: Jesus Perez Gomez, Pinto (ES)

(73) Assignee: Manufacturas Siles, S.L., Valdemoro (ES)

( * ) Notice: Subject to any disclaimer, the term of this patent is extended or adjusted under 35 U.S.C. 154(b) by 111 days.

(21) Appl. No.: 16/023,634

(22) Filed: Jun. 29, 2018

(65) Prior Publication Data

US 2019/0002357 A1    Jan. 3, 2019

(30) Foreign Application Priority Data

Jun. 30, 2017   (ES) .................................. 201730869

(51) Int. Cl.
*C04B 37/00* (2006.01)
*E03C 1/18* (2006.01)
(Continued)

(52) U.S. Cl.
CPC ............ *C04B 37/008* (2013.01); *B28B 1/002* (2013.01); *B28B 11/005* (2013.01); *C04B 33/24* (2013.01); *E03C 1/18* (2013.01); *E03C 1/33* (2013.01); *C04B 2237/343* (2013.01); *C04B 2237/525* (2013.01); *C04B 2237/80* (2013.01)

(58) Field of Classification Search
CPC ... C04B 37/008; C04B 33/24; C04B 2237/80; C04B 2237/525; C04B 2237/343; B28B 1/002; B28B 11/005; E03C 1/33; E03C 1/18; E03C 1/12; B29C 53/04
See application file for complete search history.

(56) References Cited

U.S. PATENT DOCUMENTS

2017/0107154 A1*   4/2017   Haven .................... C01F 7/021

FOREIGN PATENT DOCUMENTS

CN    1118772 A    3/1996
CN    1130162 A    9/1996
(Continued)

OTHER PUBLICATIONS

ES-2410655-A1 Machine Translation of Description (EPO and Google).*

*Primary Examiner* — Christopher T Schatz
*Assistant Examiner* — Cynthia L Schaller
(74) *Attorney, Agent, or Firm* — Haukaas Fortius PLLC; Michael H. Haukaas

(57) ABSTRACT

The invention relates to a method of making a sink comprising:
    cutting out material that will constitute a bottom of the sink;
    making a hole for a drain in the bottom of the sink;
    supporting the edges of the bottom of the sink on a flat support and applying a mechanical force on the rim of the hole for the drain in the bottom of the sink;
    subjecting the bottom of the sink to a gradual and stepwise heating such that the mechanical force applied deforms said surface;
    cooling a flat slab;
    placing additional flat slabs around the first slab, on the sides thereof, to constitute the sides of the sink;
    externally coating the assembly made with a reinforcement comprising resins, glass fiber, mineral fillers, etc.; and
    bonding the upper part of the assembly made with the countertop where the sink is located.

20 Claims, 2 Drawing Sheets

(51) Int. Cl.
*B28B 11/00* (2006.01)
*B28B 1/00* (2006.01)
*C04B 33/24* (2006.01)
*E03C 1/33* (2006.01)

(56) References Cited

FOREIGN PATENT DOCUMENTS

| | | | |
|---|---|---|---|
| EP | 0949219 | A1 | 10/1999 |
| ES | 2265214 | A1 | 2/2007 |
| ES | 1069853 | U | 5/2009 |
| ES | 2355993 | A1 | 4/2011 |
| ES | 2410655 | A1 * | 7/2013 |
| ES | 2593309 | B2 | 7/2017 |

* cited by examiner

METHOD OF MAKING A SINK FROM CERAMIC MATERIAL SLABS

RELATED APPLICATION

This application claims priority under 35 U.S.C. § 119 and 37 C.F.R. 1.55 to Spanish Patent Application No. P201730869, filed Jun. 30, 2017, which application is incorporated herein by reference.

TECHNICAL FIELD OF THE INVENTION

The present invention corresponds to the technical field of making sinks made from flat, low-porosity, compact porcelain ceramic material slabs, specially to the method of making same.

BACKGROUND OF THE INVENTION

There is currently a growing demand for products made by means of low-porosity, compact porcelain ceramic material due to the characteristics offered by such material, such as high mechanical performance and a low level of internal stresses, which allows being machined in large-sized pieces.

This material is manufactured by a number of manufacturers worldwide, among which the most well-known are COSENTINO, S.A., which manufactures the material DEKTON®, and THESIZE SURFACES, S.L., which manufactures the material known as NEOLITH®, where both of such materials have similar technical characteristics.

Spanish patent documents ES2593095 and ES2593309, which define methods of manufacturing these materials, can be mentioned as an example of the state of the art of these materials.

Spanish patent document ES2593095 defines a compact ceramic material with a low level of internal stresses, a method for manufacturing the ceramic material, as well as the use of this compact ceramic material as a building material for façades and claddings.

Spanish patent document ES2593309 defines a low-porosity, compact ceramic material and a method for obtaining said material.

Both patents define methods for producing large-sized flat sheets or slabs.

As a result of the size and lightweight nature of this material, the design possibilities for kitchens, bathrooms, façades, walls, or flooring with significant foot traffic, and the wide range of colors and designs that can be obtained, increase significantly.

Furthermore, it has many advantages over conventional materials, such as high resistance to ultraviolet rays and the fact that its color does not fade over time, making it a perfect material for both indoors and outdoors.

It also has a highly scratch-resistant surface, and as a result of its low porosity, it is a surface that is highly resistant to both the usual stains found with domestic use and chemicals. It has very good resistance to high temperatures without its appearance or its properties being affected, is more abrasion-resistant than granite, and is resistant to freezing and thawing.

This material, which is presented in slab form, can be suitably applied in countertops and in places where a flat surface is required; nevertheless, when it is intended to be used on surfaces having a curved shape, such as the bottom of a sink, for example, the slab must be cut multiple times to slowly form said curved shape based on the attachment and arrangement of said cut pieces. This has certain drawbacks, such as a high percentage of material waste, significant cutting work, low efficiency, and, as a result of the foregoing, high product cost.

Furthermore, the result of the product is not altogether satisfactory, as it has multiple joints and areas are generated in these joints where grime builds up, and these areas are weaker, where the properties of this material are affected by external factors.

There is currently a growing demand for products produced with this material given its enormous advantages, but continuous products with no joints that weaken areas in such products are not obtained with the ways for making them existing today.

European patent document EP0949219 can be mentioned as an example of the state of the art, which patent defines a method for manufacturing curved ceramic sheets, more specifically a process and arc oven for bending flat ceramic sheets into curved ceramic sheets by heat treatment.

In this method, a first step of placing the ceramic sheet in an electric oven in which some of the heating elements are in a curved arrangement is performed. The second step is controlling the temperature and the time to make the flat sheet to heat up and bend until the surface thereof contacts and conforms with the curved shaping surface of the oven, defined by the heating elements. Then the oven chamber is cooled and the curved ceramic sheet is removed.

In this case it is possible to obtain a curved sheet with a given radius, but substantial modifications must be made to the oven if a sheet having a different curvature is to be obtained. The drawback is that it is not possible to obtain shapes other than a surface curved into an arcuate shape, so use of this material for any type of curved element is again limited and a method that can offer this possibility has not been found.

It has furthermore been demonstrated that heating the low-porosity, compact porcelain ceramic material until achieving a plasticity point such that it makes it easier to bend, causes said material to break as it is transformed into an extremely brittle product and even causes it to change its original color when it cools down, thereby rendering the material useless.

In natural materials such as marbles, granites, etc., the bottom of the sink can be made to have an inclination by means of roughing down the material constituting the bottom of the sink, which achieves a natural slope towards the drain, to subsequently polish that roughed-down surface. This technique is not possible in low-porosity, compact porcelain ceramic materials such as the one proposed to be used in this invention as it would render the material useless.

DESCRIPTION OF THE INVENTION

The method of the invention consists of making a sink from flat, low-porosity, compact porcelain ceramic material slabs, said method comprising a series of steps.

The first step consists of cutting out the material that will constitute the bottom of the sink, which material can take on the shape of a square slab, rectangular slab, oval slab, or any other shape suitable for making said sink.

The second step consists of making the hole for the drain in the bottom of the sink, which hole will be made by conventional means such as cutting elements, which will generally allow making a circular hole for the drain. This hole can be made such that it is in the center in said bottom of the sink or it can be shifted towards the edges thereof.

The third step consists of supporting the edges of the bottom of the sink on a flat support and applying a mechanical force on the rim of the hole for the drain in the bottom of the sink, which mechanical force on the material at room temperature has no effect on the material.

The fourth step consists of subjecting this flat slab forming the bottom of the sink to a gradual and stepwise heating until reaching a heating temperature greater than the annealing temperature and less than the melting temperature of the compact ceramic material, without the physical or chemical properties of said material changing, such that the mechanical force applied on the rim of the hole for the drain in the bottom of the sink deforms said surface, a continuous surface inclined towards the drain being obtained.

Then, a fifth step of cooling the flat slab constituting the bottom of the sink with the new shape it has taken on takes place, which step consisting of cooling performed in a gradual and stepwise manner until reaching room temperature, preventing residual stresses of the material used.

The sixth step consists of placing additional flat slabs around the slab constituting the bottom of the sink, on the sides thereof, to constitute the sides of the sink, being bonded together by bonding means.

A seventh step consists of externally coating the assembly made with a reinforcement consisting of resins, glass fiber, mineral fillers, etc., increasing the strength of the sink made.

Finally, a last step consists of bonding the upper part of the additional slabs, constituting the side body of the sink, to the edges of the opening in the countertop where the sink is located.

According to a preferred embodiment, the heating temperature of the first step is less than 900° C.

According to a preferred embodiment, the ceramic material comprises a percentage by weight of glassy phase comprised between 40% and 85%, has a density comprised between 2.3 and 3.0 g/cm$^3$, and has an internal porosity less than 4% by volume.

According to a preferred embodiment, the bonding means for bonding the lower part of the additional slabs with the first slab and the sides of the additional slabs together are formed by a resin.

In another preferred embodiment, said bonding means are formed by an adhesive with a color similar to the color of the first slab and the additional slabs.

Another preferred embodiment of the mentioned invention consists of making a sink body with bonding edges between the pieces rounded, for which purpose the pieces to be bonded are placed on a mold defining the shape of the sink, which mold has curved edges and on which mold the pieces of the sink to be bonded are placed but they do not actually touch one another, such that the gaps defined between the pieces are filled with adhesive or resin of the type used for fixing these pieces, and so when the mold is removed, the corner joints acquire the rounded shape of the mold.

This invention further proposes making a sink from a low-porosity, compact porcelain ceramic material, made by means of the method described above.

A significant improvement of the state of the art is obtained with the method of making three-dimensional products from flat, low-porosity, compact porcelain ceramic material slabs herein proposed.

So with this method it is possible to make a sink with this material having suitable features, in which the bottom is made with a single slab, therefore preventing the presence of bonding joints in said sensitive area of the sink.

Since this deformation is generated by means of prior heating at a controlled temperature that does not exceed the melting point of the material, the nature of said material is not transformed or changed in any way, therefore maintaining all its characteristics.

It is a simple method that is very effective in obtaining three-dimensional products which therefore have characteristics determined by the type of material, which was not possible without this process. Furthermore, according to the place where the mechanical force or forces are applied, different curved shapes of the bottom of the sink can be obtained with this method, not being limited to a single arcuate shape.

BRIEF DESCRIPTION OF THE DRAWINGS

For the purpose of helping to better understand the features of the invention according to a preferred practical embodiment thereof, a series of drawings is provided as an integral part of said description in which the following has been depicted with an illustrative and non-limiting character.

DETAILED DESCRIPTION OF A PREFERRED EMBODIMENT OF THE INVENTION

Figure 1:
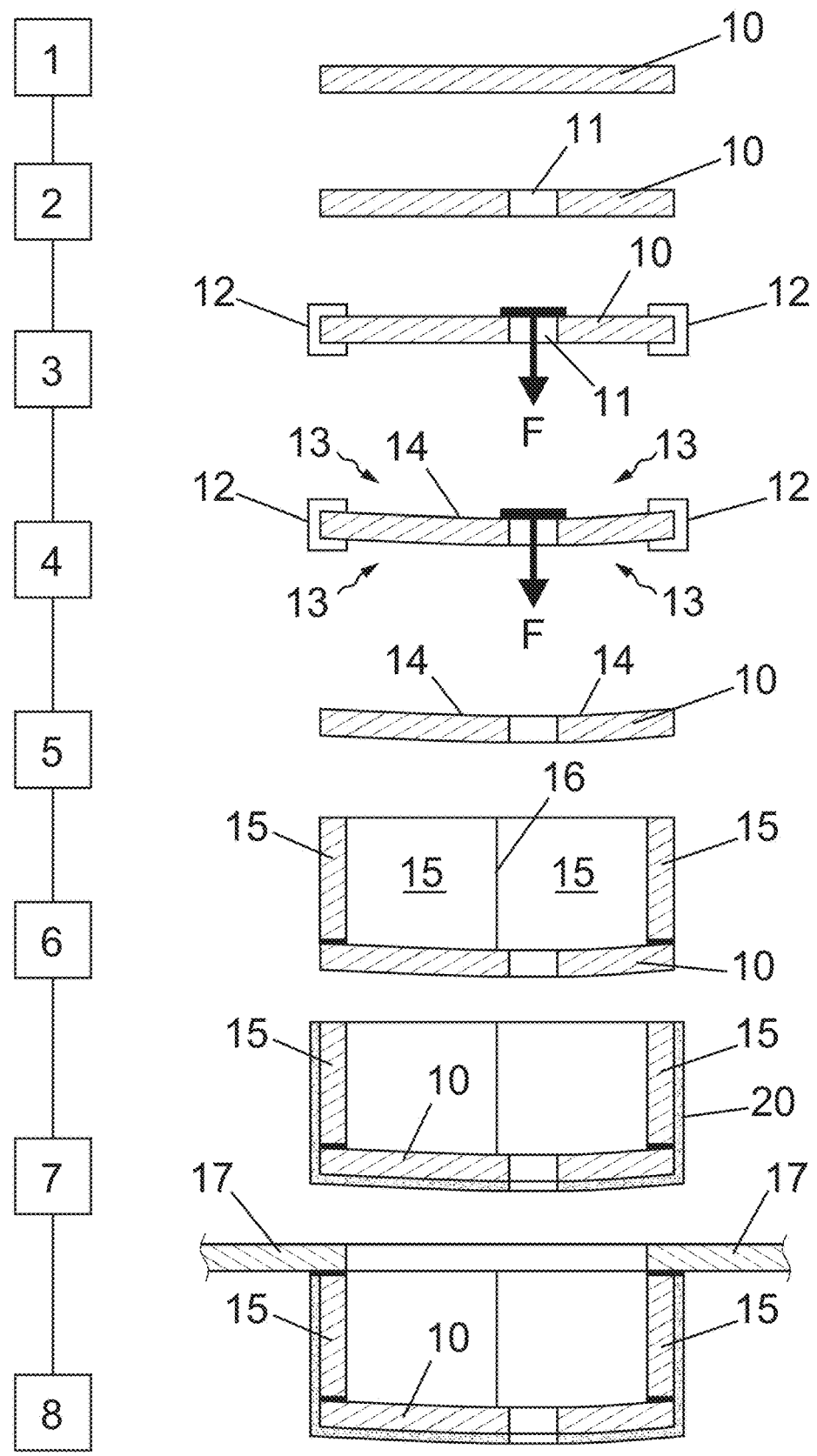
FIG. 1 shows a block diagram of the method of making three-dimensional products from flat, low-porosity, compact porcelain ceramic material slabs for a preferred embodiment of the invention, the shape of the product that is being obtained being shown on one side.

In view of the drawings, it can be seen how in a preferred embodiment of the invention, the method of making a sink from flat, low-porosity, compact porcelain ceramic material slabs herein proposed comprises the following steps.

The first step (1) consists of cutting out the material that will constitute the bottom of the sink (10), which material can take on the shape of a square slab, rectangular slab, oval slab, or any other shape suitable for making said sink.

The second step (2) consists of making the hole (11) for the drain in the bottom of the sink (10), which hole will be made by conventional means such as cutting elements, which will generally allow making a circular hole for the drain. This hole can be made such that it is in the center in said bottom of the sink or it can be shifted towards the edges thereof.

The third step (3) consists of supporting the edges of the bottom of the sink on a flat support (12) and applying a mechanical force (F) on the rim of the hole (11) for the drain in the bottom of the sink (10), which mechanical force (F) on the material at room temperature has no effect on the material.

The fourth step (4) consists of subjecting this flat slab forming the bottom of the sink (10) to a gradual and stepwise heating (13) until reaching a heating temperature greater than the annealing temperature and less than the melting temperature of the compact ceramic material, without the physical or chemical properties of said material changing, such that the mechanical force applied on the rim of the hole for the drain in the bottom of the sink deforms said surface, a continuous surface inclined towards the drain (14) being obtained.

Then, a fifth step (5) of cooling the flat slab constituting the bottom of the sink with the new shape it has taken on takes place, which step consisting of cooling performed in a gradual and stepwise manner until reaching room temperature, preventing residual stresses of the material used.

The sixth step (6) consists of placing additional flat slabs (15) around the first slab (10), on the sides thereof, to constitute the sides of the sink, and bonding (16) the lower part of the additional slabs with the slab constituting the bottom of the sink and the sides of the additional slabs together by bonding means (16), which bonding means can be resins or adhesives.

A seventh step consists of externally coating the assembly made with a reinforcement consisting of resins, glass fiber, mineral fillers, etc. (20), increasing the strength of the sink made.

Finally, a last step consists of bonding the upper part of the additional slabs (15), constituting the side body of the sink, to the edges of the opening in the countertop (17) where the sink is located, which bonding is likewise done with resins or adhesives.

Figure 2:
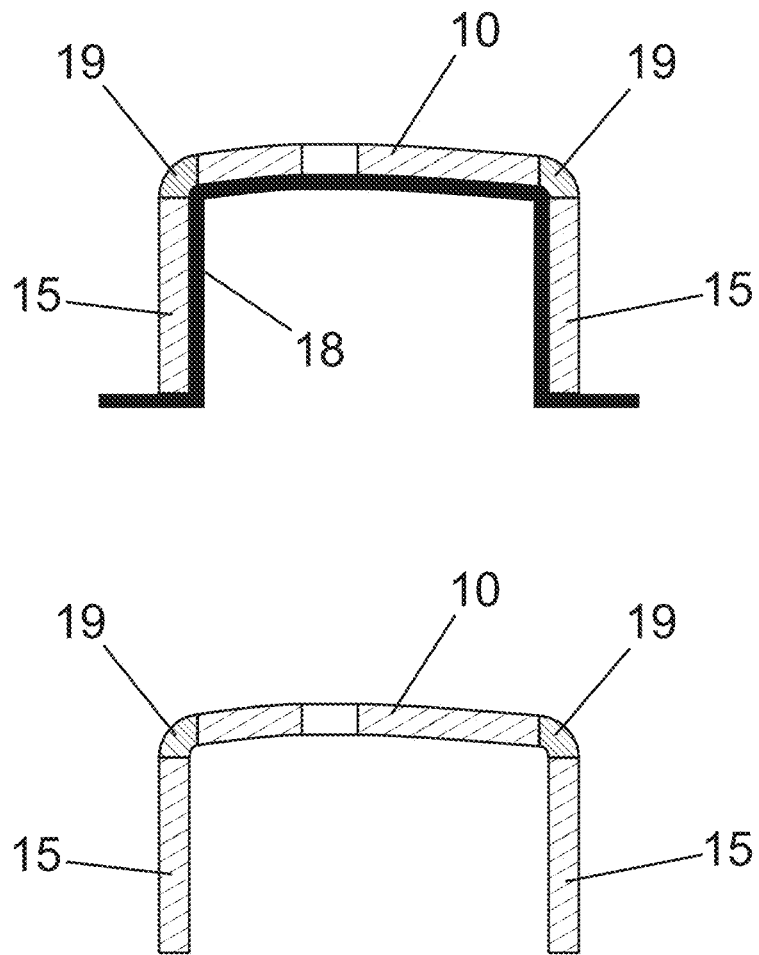
FIG. 2 shows the process of bonding the bottom of the sink to the side pieces that will constitute the sink by means of a mold which makes it easier to round out the bonding edges of the pieces that will constitute the sink.

FIG. 2 shows the process of bonding the bottom of the sink (10) to the side pieces (15) that will constitute the sink by means of a mold (18) which makes it easier to round out the bonding edges of the pieces that will constitute the sink. These edges (19) will be made by means of resins or adhesives which adapt to the curved shape of the mold (18) at those bonding points, preventing sharp edges and preventing grime from building up during normal use of the sink.

According to a preferred embodiment, the heating temperature of the first step is less than 900° C.

In a preferred embodiment of the invention, it is preferably considered that the annealing temperature is 750° C. and the melting temperature is greater than 1000° C., so the heating temperature must be comprised between those two values.

In this preferred embodiment of the invention, it is considered that the heating temperature is less than 900° C. to furthermore assure that the color tones of the product do not fade.

As the product is not heated at temperatures equal to or greater than the melting temperature, the product does not have to be annealed in order to release stresses, because since said temperatures are not reached, these stresses are not generated.

On the other hand, in this preferred embodiment of the invention the ceramic material comprises a percentage by weight of glassy phase comprised between 40% and 85%, has a density comprised between 2.3 and 3.0 g/cm$^3$, and has an internal porosity less than 4% by volume. In this case and in a preferred manner, the percentage by weight of glassy phase is 60%, the density is 2.6 g/cm$^3$, and it has a porosity of 2%.

This specification furthermore discloses a sink made of a low-porosity, compact porcelain ceramic material by means of the preceding method.

The described embodiment is merely one example of the present invention. Therefore, the specific details, terms, and phrases used herein must not be considered as being limiting, but rather they must merely be understood as a basis for the claims and as a representative basis providing a comprehensible description and sufficient information for one skilled in the art to apply the present invention.

Significant improvements with respect to the state of the art are achieved with the method of making three-dimensional products from flat, low-porosity, compact porcelain ceramic material slabs herein disclosed.

A process which allows making sinks with this type of low-porosity, compact porcelain ceramic material, with a continuous bottom, i.e., without joints and maintaining all the properties thereof, is thereby obtained. It furthermore allows obtaining these products with shapes that can vary depending on the areas in which the mechanical force is applied.

The present invention provides a simple, practical, and very effective method.

What is claimed is:

1. A method of making a sink from flat, low-porosity, compact porcelain ceramic material slabs, comprising the following steps:
    a first step consisting of cutting out a first flat material slab;
    a second step consisting of making a drain hole in the first flat material slab;
    a third step consisting of supporting the first flat material slab on a flat support and applying a mechanical force on and/or around the drain hole;
    a fourth step consisting of subjecting the first flat material slab to a gradual and stepwise heating until reaching a heating temperature greater than an annealing temperature and less than a melting temperature of the first flat material slab, such that the mechanical force being applied on and/or around the drain hole deforms the first flat material slab at the heating temperature, resulting in a continuous curved surface material slab inclined towards the drain hole;
    a fifth step consisting of cooling the curved surface material slab in a gradual and stepwise manner until reaching room temperature;
    a sixth step consisting of:
        (a) placing additional flat material slabs around the curved surface material slab; and
        (b) bonding:
            (i) a lower part of each additional flat material slab to the curved surface material slab; and
            (ii) the additional flat material slabs to one another;
    wherein the curved surface material slab constitutes a bottom of the sink having the drain hole, and the additional flat material slabs constitute sides of the sink.

2. The method of claim 1, wherein the heating temperature is less than 900° C.

3. The method of claim 1, wherein the first flat material slab, the curved surface material slab, and the additional flat material slabs, each comprise a glass-ceramic having: (i) between 40% and 85% by weight of a glassy phase, (ii) a density of between 2.3 and 3.0 g/cm$^3$, and (iii) an internal porosity of less than 4% by volume.

4. The method of claim 1, wherein a resin is utilized to effect the bonding of:
    (i) the lower part of each additional flat material slab to the curved surface material slab; and
    (ii) the additional flat material slabs to one another.

5. The method of claim 1, wherein an adhesive is utilized to effect the bonding of:
    (i) the lower part of each additional flat material slab to the curved surface material slab; and
    (ii) the additional flat material slabs to one another;
    and wherein the adhesive, the first flat material slab and the additional flat material slabs have a similar color.

6. A sink made by the method of claim 1.

7. The method of claim 1, further comprising a seventh step consisting of externally coating the sink with a reinforcement consisting of resins, glass fibers, and/or mineral fillers.

8. The method of claim 7, further comprising an eighth step consisting of placing the sink in an opening of a countertop and bonding an upper part of each of the additional flat material slabs to the countertop with a resin or an adhesive.

9. The method of claim 1, wherein the annealing temperature is 750° C. and the melting temperature is greater than 1,000° C.

10. A method of making a sink from low-porosity, compact porcelain ceramic material slabs, comprising the following steps:
- a first step consisting of cutting out a first flat material slab;
- a second step consisting of making a drain hole in the first flat material slab;
- a third step consisting of supporting the first flat material slab on a flat support and applying a mechanical force on and/or around the drain hole;
- a fourth step consisting of subjecting the first flat material slab to a gradual and stepwise heating until reaching a heating temperature greater than an annealing temperature and less than a melting temperature of the first flat material slab, such that the mechanical force being applied on and/or around the drain hole deforms the first flat material slab at the heating temperature, resulting in a continuous curved surface material slab inclined towards the drain hole;
- a fifth step consisting of cooling the curved surface material slab in a gradual and stepwise manner until reaching room temperature;
- a sixth step consisting of:
  - (a) preparing a rounded shape mold defining a shape of the sink for supporting the material slabs;
  - (b) placing the curved surface material slab having the drain hole along an area of the mold that constitutes a bottom of the sink;
  - (c) placing additional flat material slabs along areas of the mold that constitute sides of the sink in a separated manner, such that there are gaps between each of the additional flat material slabs, and gaps between each of the additional flat material slabs and the curved surface material slab;
  - (d) filling the gaps between all of the material slabs with an adhesive or a resin to effect bonding of the material slabs to one another; and
  - (e) removing the mold to leave behind the sink;
  wherein the shape of the sink acquires the rounded shape of the mold.

11. The method of claim 10, wherein the heating temperature is less than 900° C.

12. The method of claim 10, wherein the annealing temperature is 750° C. and the melting temperature is greater than 1,000° C.

13. The method of claim 10, wherein the first flat material slab, the curved surface material slab, and the additional flat material slabs, each comprise a glass-ceramic having: (i) between 40% and 85% by weight of a glassy phase, (ii) a density of between 2.3 and 3.0 g/cm$^3$, and (iii) an internal porosity of less than 4% by volume.

14. The method of claim 10, further comprising a seventh step consisting of externally coating the sink with a reinforcement consisting of resins, glass fibers, and/or mineral fillers.

15. The method of claim 14, further comprising an eighth step consisting of placing the sink in an opening of a countertop and bonding an upper part of each of the additional flat material slabs to the countertop with a resin or an adhesive.

16. A sink made by the method of claim 10.

17. The method of claim 10, wherein the first flat material slab has a square shape, a rectangular shape, or an oval shape.

18. The method of claim 1, wherein the first flat material slab has a square shape, a rectangular shape, or an oval shape.

19. The method of claim 1, wherein the additional flat material slabs are placed in a substantially perpendicular orientation around the curved surface material slab in part (a) of the sixth step.

20. The method of claim 1, wherein the applied mechanical force is removed between the fourth and fifth steps.

* * * * *